(12) United States Patent
Takeuchi et al.

(10) Patent No.: US 8,329,020 B2
(45) Date of Patent: Dec. 11, 2012

(54) METHOD OF SHUTTING DOWN WATER ELECTROLYSIS SYSTEM

(75) Inventors: Jun Takeuchi, Utsunomiya (JP); Masanori Okabe, Nerima-ku (JP); Koji Nakazawa, Utsunomiya (JP); Kenji Taruya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 347 days.

(21) Appl. No.: 12/707,221

(22) Filed: Feb. 17, 2010

(65) Prior Publication Data

US 2010/0206740 A1    Aug. 19, 2010

(30) Foreign Application Priority Data

Feb. 19, 2009   (JP) .................................. 2009-036417

(51) Int. Cl.
*C02F 1/46* (2006.01)
(52) U.S. Cl. ........................................ 205/637; 205/628
(58) Field of Classification Search ........... 205/628–639
See application file for complete search history.

(56) References Cited

U.S. PATENT DOCUMENTS 6,896,789 B2 * 5/2005 Ross ........................... 205/633

FOREIGN PATENT DOCUMENTS

| JP | 7-286293 | 10/1995 |
|---|---|---|
| JP | 2002-53989 | 2/2002 |
| JP | 2005-50749 | 2/2005 |
| JP | 2005-180545 | 7/2005 |
| JP | 2006-222062 | 8/2006 |
| JP | 2007-100204 | 4/2007 |

OTHER PUBLICATIONS

Japanese Office Action for Application No. 2009-036417, dated Jul. 26, 2011.

* cited by examiner

*Primary Examiner* — Arun S Phasge
(74) *Attorney, Agent, or Firm* — Nelson Mullins Riley & Scarborough LLP; Anthony A. Laurentano

(57) ABSTRACT

A water electrolysis system includes a water electrolysis apparatus for electrolyzing pure water supplied from a pure water supply apparatus to produce high-pressure hydrogen. A pressure releasing device is connected between a pipe of the water electrolysis apparatus and a check valve connected to the inlet port of a gas-liquid separator, for releasing the pressure of the high-pressure hydrogen from the water electrolysis apparatus independently from the gas-liquid separator. The pressure releasing device has a bleeder passage including a pressure reducing valve and a solenoid-operated valve.

3 Claims, 7 Drawing Sheets

METHOD OF SHUTTING DOWN WATER ELECTROLYSIS SYSTEM

CROSS-REFERENCE TO RELATED APPLICATION

This application is based upon and claims the benefit of priority from Patent Application No. 2009-036417 filed on Feb. 19, 2009, in the Japan Patent Office, of which the contents are incorporated herein by reference.

BACKGROUND OF THE INVENTION

1. Field of the Invention

The present invention relates to a water electrolysis system having a water electrolysis apparatus for electrolyzing water with an electric current supplied from a DC power supply to generate hydrogen and oxygen and a high-pressure hydrogen processing apparatus disposed downstream of and connected to a hydrogen outlet of the water electrolysis apparatus, for refining high-pressure hydrogen discharged from the hydrogen outlet which discharges hydrogen under a pressure higher than a normal pressure, and a method of shutting down such a water electrolysis system.

2. Description of the Related Art

Solid polymer electrolyte fuel cells generate DC electric energy when anodes thereof are supplied with a fuel gas, i.e., a gas mainly composed of hydrogen, e.g., a hydrogen gas, and cathodes thereof are supplied with an oxygen-containing gas, a gas mainly composed of oxygen, e.g., air.

Generally, water electrolysis apparatus are used to generate a hydrogen gas for use as a fuel gas for such solid polymer electrolyte fuel cell. The water electrolysis apparatus employ a solid polymer electrolyte membrane (ion exchange membrane) for decomposing water to generate hydrogen (and oxygen). Electrode catalyst layers are disposed on the respective sides of the solid polymer electrolyte membrane, making up a membrane electrode assembly. Electric feeders are disposed on the respective sides of the membrane electrode assembly, making up a unit. The unit is essentially similar in structure to the fuel cells described above.

A plurality of such units are stacked, and a voltage is applied across the stack while water is supplied to the electric feeders on the anode side. On the anodes of the membrane electrode assembly, the water is decomposed to produce hydrogen ions (protons). The hydrogen ions move through the solid polymer electrolyte membranes to the cathodes, where the hydrogen ions combine with electrons to generate hydrogen. On the anodes, oxygen generated together with hydrogen is discharged with excess water from the units.

Such a water electrolysis system generates hydrogen under a high pressure of several tens MPa. Japanese Laid-Open Patent Publication No. 2007-100204 discloses a method of and an apparatus for manufacturing high-pressure hydrogen. As shown in FIG. 7 of the accompanying drawings, the disclosed apparatus for manufacturing high-pressure hydrogen comprises a high-pressure oxygen vessel 1, a differential pressure regulator 2, a high-pressure hydrogen vessel 3, an electrolytic cell 4, a moisture-adsorption tube 5, a back-pressure valve 6, and a deoxidization tube 7.

Pure water contained in the high-pressure oxygen vessel 1 is delivered to an anode side of the electrolytic cell 4 by a circulation pump 8. The pure water delivered to the electrolytic cell 4 is electrolyzed when the electrolytic cell 4 is energized by a power supply 9. Oxygen generated from the pure water by the electrolytic cell 4 is delivered, together with returning pure water from the circulation pump 8, to the high-pressure oxygen vessel 1.

Hydrogen generated at the cathode of the electrolytic cell 4 is discharged, together with permeated water, into the high-pressure hydrogen vessel 3. At this time, the differential pressure regulator 2 equalizes the pressure in the high-pressure oxygen vessel 1 and the pressure in the high-pressure hydrogen vessel 3 to each other.

The hydrogen stored in the high-pressure hydrogen vessel 3 is delivered to the deoxidization tube 7, which removes oxygen contained in the hydrogen. The hydrogen is then delivered from the deoxidization tube 7 through the back-pressure valve 6 to the moisture-adsorption tube 5, which removes moisture from the hydrogen, thereby finalizing the hydrogen as a product.

As described above, the apparatus for manufacturing high-pressure hydrogen disclosed in Japanese Laid-Open Patent Publication No. 2007-100204 generates high-pressure hydrogen and high-pressure oxygen, using the high-pressure oxygen vessel 1 and the high-pressure hydrogen vessel 3. Another water electrolysis system for generating high-pressure hydrogen employs a differential pressure generating process which keeps generated hydrogen under a high pressure while keeping water and generated oxygen under a normal pressure.

According to the differential pressure generating process, when the water electrolysis system is shut down, it is necessary to return a high-pressure hydrogen line in the water electrolysis apparatus (electrolytic cell) back to the normal pressure (atmospheric pressure). This is because if the solid polymer electrolyte membrane is maintained under a differential pressure at all times, then the solid polymer electrolyte membrane is susceptible to damage.

Practically, the pressure of the high-pressure hydrogen which remains in a facility that is connected downstream of the water electrolysis apparatus, e.g., the deoxidization tube 7 or the moisture-adsorption tube 5 in Japanese Laid-Open Patent Publication No. 2007-100204, is reduced to the normal pressure. Since the high-pressure hydrogen remaining in the high-pressure line is depressurized, the depressurized high-pressure hydrogen is wasted. Therefore, the water electrolysis system is uneconomical.

In addition, when the water electrolysis system is to be resumed, it takes a considerable time to pressurize the high-pressure hydrogen line downstream of the water electrolysis apparatus, i.e., to fill the high-pressure hydrogen line downstream of the water electrolysis apparatus with high-pressure hydrogen. Consequently, the resumption of the water electrolysis process requires an increase in the power consumption, is time-consuming and hence is not efficient.

SUMMARY OF THE INVENTION

It is an object of the present invention to provide a water electrolysis system and a method of shutting down such a water electrolysis system, which are capable of minimizing the amount of high-pressure hydrogen to be wasted that exists downstream of a water electrolysis apparatus when the water electrolysis apparatus, which generates high-pressure hydrogen, is depressurized to a normal pressure, for thereby performing a water electrolysis process efficiently and economically.

According to the present invention, there is provided a water electrolysis system comprising a water electrolysis apparatus for electrolyzing water with an electric current supplied from a DC power supply to generate hydrogen and oxygen, a high-pressure hydrogen processing apparatus disposed downstream of and connected to a hydrogen outlet of the water electrolysis apparatus, for refining high-pressure hydrogen discharged from the hydrogen outlet which discharges hydrogen under a pressure higher than a normal pressure, an inlet valve and an outlet valve which are connected respectively to an inlet port and an outlet port of the high-pressure hydrogen processing apparatus, and a pressure releasing device connected between the hydrogen outlet and the inlet valve, for releasing the pressure of the high-pressure hydrogen from the water electrolysis apparatus independently from the high-pressure hydrogen processing apparatus.

According to the present invention, there is also provided a system shutdown method for shutting down a water electrolysis system including a water electrolysis apparatus for electrolyzing water with an electric current supplied from a DC power supply to generate hydrogen and oxygen, and a high-pressure hydrogen processing apparatus disposed downstream of and connected to a hydrogen outlet of the water electrolysis apparatus, for refining high-pressure hydrogen discharged from the hydrogen outlet which discharges hydrogen under a pressure higher than a normal pressure, the system shutdown method comprising the steps of closing an outlet valve connected to an outlet port of the high-pressure hydrogen processing apparatus, and shutting down the water electrolysis apparatus, closing an inlet valve connected to an inlet port of the high-pressure hydrogen processing apparatus, releasing the pressure of the high-pressure hydrogen from the water electrolysis apparatus independently from the high-pressure hydrogen processing apparatus, with a pressure releasing device connected between the hydrogen outlet and the inlet valve, and stopping releasing the pressure of the high-pressure hydrogen from the water electrolysis apparatus when the pressure of the high-pressure hydrogen from the water electrolysis apparatus drops to an atmospheric pressure.

According to the present invention, for shutting down the water electrolysis system, the hydrogen pressure in the water electrolysis apparatus is released independently from the high-pressure hydrogen processing apparatus by the pressure releasing device which is connected between the hydrogen outlet of the water electrolysis apparatus and the inlet valve of the high-pressure hydrogen processing apparatus.

Therefore, the high-pressure hydrogen processing apparatus, which contains a relatively large amount of high-pressure hydrogen therein, does not need to be depressurized, and any amount of high-pressure hydrogen which would otherwise be wasted is minimized. Consequently, the water electrolysis system can electrolyze water efficiently and economically.

In addition, for resuming the water electrolysis system, only a minimum volume required, i.e., the water electrolysis apparatus, needs to be pressurized because the high-pressure hydrogen processing apparatus is kept under high pressure. Therefore, the power consumption at the time the water electrolysis system is resumed is kept low, the water electrolysis system can be resumed quickly, and its efficiency is easily increased.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
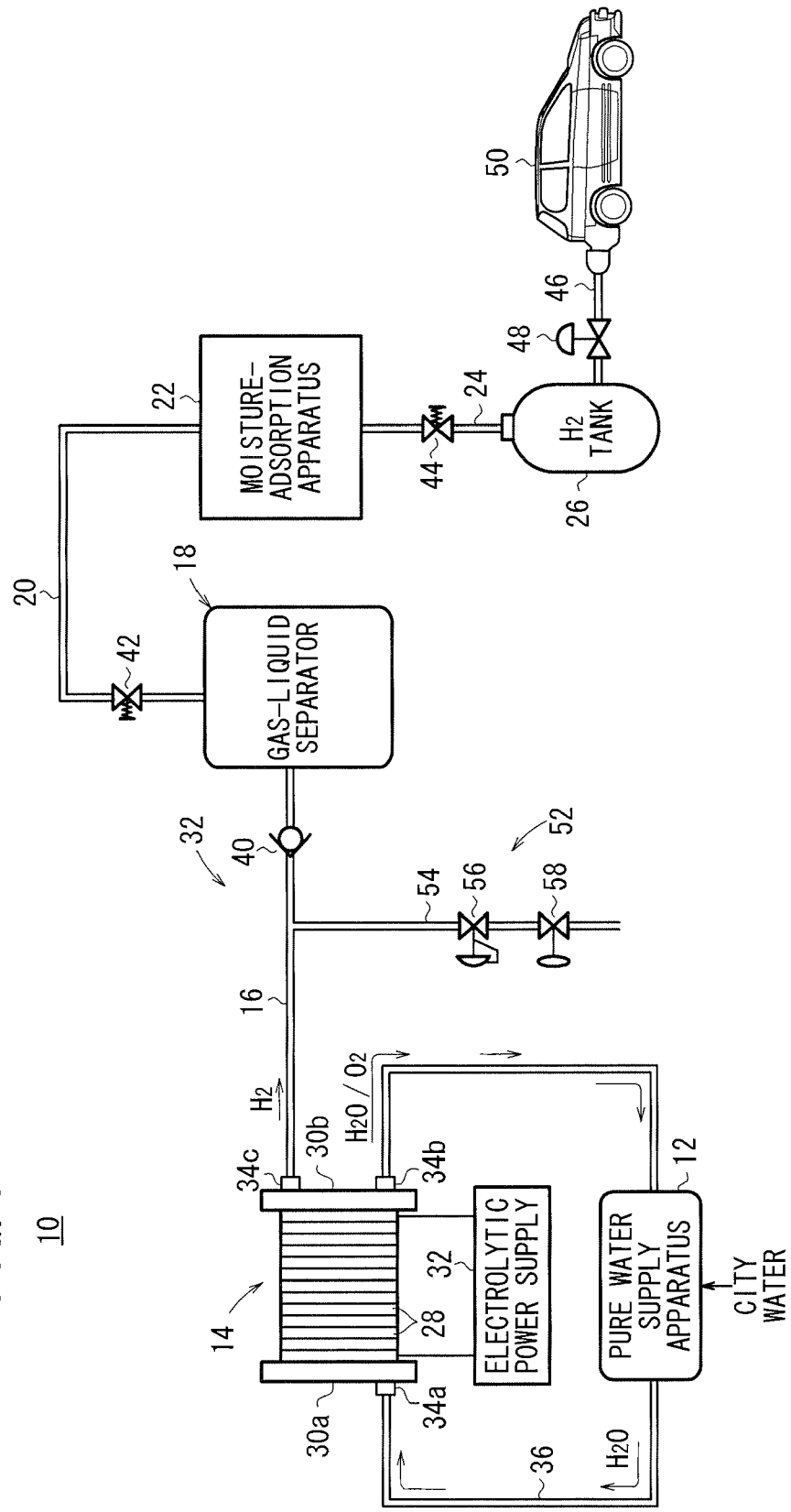
FIG. 1 is a schematic diagram of a water electrolysis system to which a system shutdown method according to a first embodiment of the present invention is applied.

Like or corresponding parts are denoted by like or corresponding reference characters throughout views.

As shown in FIG. 1, a water electrolysis system 10 to which a system shutdown method according to a first embodiment of the present invention is applied comprises a water electrolysis apparatus 14 for being supplied with pure water that has been generated from city water from a pure water supply apparatus 12 and electrolyzing the pure water to produce high-pressure hydrogen (whose pressure is higher than a normal pressure), a gas-liquid separator (high-pressure hydrogen processing apparatus) 18 for removing moisture contained in the high-pressure hydrogen delivered from the water electrolysis apparatus 14 into a hydrogen outlet passage 16, a moisture-adsorption apparatus (high-pressure hydrogen processing apparatus) 22 for adsorbing and eliminating moisture contained in hydrogen delivered from the gas-liquid separator 18 into a hydrogen supply passage 20, and a hydrogen tank 26 for storing the hydrogen (dry hydrogen) that is delivered out to a dry hydrogen supply passage 24 connected to the moisture-adsorption apparatus 22. The hydrogen tank 26 is optional, and may be added when necessary or may be dispensed with.

The water electrolysis apparatus 14 comprises a stack of water electrolysis cells 28 and a pair of end plates 30a, 30b disposed respectively on the opposite ends of the stack of water electrolysis cells 28. An electrolytic power supply 32 in the form of a DC power supply is connected across the water electrolysis apparatus 14. The water electrolysis apparatus 14 has an anode connected to the positive terminal of the electrolytic power supply 32 and a cathode connected to the negative terminal of the electrolytic power supply 32.

A pipe 34a is connected to the end plate 30a, and pipes 34b, 34c are connected to the end plate 30b. The pure water from the pure water supply apparatus 12 is circulated through a circulation passage 36 to the pipes 34a, 34b. The pipe 34c, which serves as a hydrogen outlet, is connected by the hydrogen outlet passage 16 to the gas-liquid separator 18.

The hydrogen outlet passage 16 includes a check valve (inlet valve) 40 near the inlet port of the gas-liquid separator 18. The hydrogen supply passage 20 includes a back-pressure valve (outlet valve) 42 near the outlet port of the gas-liquid separator 18. The check valve 40 may be replaced with any of various valves such as a solenoid-operated valve or the like. The back-pressure valve 42 may be replaced with any of various valves such as a flow rate regulating valve or the like.

The moisture-adsorption apparatus 22 includes an adsorption tower (not shown) filled with a moisture-adsorptive agent for physically adsorbing a water vapor (moisture) contained in hydrogen, the moisture-adsorptive agent being regenerated when it discharges adsorbed moisture. The dry hydrogen supply passage 24 is connected to the outlet port of the moisture-adsorption apparatus 22 through a back-pressure valve (outlet valve) 44.

The hydrogen tank 26 is connected to the dry hydrogen supply passage 24. A hydrogen supply passage 46 is connected to the hydrogen tank 26 through a valve 48. The hydrogen supply passage 46 can be connected directly or via a reservoir tank, not shown, to the fuel tank of a fuel cell vehicle 50.

The water electrolysis system 10 further includes a pressure releasing device 52 connected to the hydrogen outlet passage 16 between the pipe 34c and the check valve 40. The pressure releasing device 52 has a function to release the hydrogen pressure in the water electrolysis apparatus 14 independently from the gas-liquid separator 18 and other components connected downstream thereof. The pressure releasing device 52 has a bleeder passage 54 branched from the hydrogen outlet passage 16 and including an adjusting mechanism for adjusting the pressure releasing rate, e.g., a pressure reducing valve 56, and an on-off valve, e.g., a solenoid-operated valve 58.

Operation of the water electrolysis system 10 will be described below.

When the water electrolysis system 10 starts to operate, the water electrolysis apparatus 14 is supplied with pure water that has been generated from city water by the pure water supply apparatus 12. The water electrolysis apparatus 14 electrolyzes the pure water to produce hydrogen when it is energized by the electrolytic power supply 32.

The hydrogen generated by the water electrolysis apparatus 14 is delivered through the hydrogen outlet passage 16 to the gas-liquid separator 18. In the gas-liquid separator 18, a water vapor contained in the hydrogen is separated from the hydrogen. The hydrogen is then boosted to a given pressure (a preset back pressure) by the back-pressure valve 42.

The high-pressure hydrogen is then supplied through the hydrogen supply passage 20 to the moisture-adsorption apparatus 22. The moisture-adsorption apparatus 22 adsorbs a water vapor contained in the high-pressure hydrogen to produce hydrogen in a dry state (dry hydrogen), and then delivers the dry hydrogen to the dry hydrogen supply passage 24.

The dry hydrogen delivered to the dry hydrogen supply passage 24 is stored in the hydrogen tank 26. By opening the valve 48 as needed, the dry hydrogen stored in the hydrogen tank 26 is sent through the hydrogen supply passage 46 to the fuel cell vehicle 50, filling the fuel tank thereof.

The system shutdown method according to the first embodiment of the present invention will be described below with reference to a flowchart shown in FIG. 2.

Figure 2:
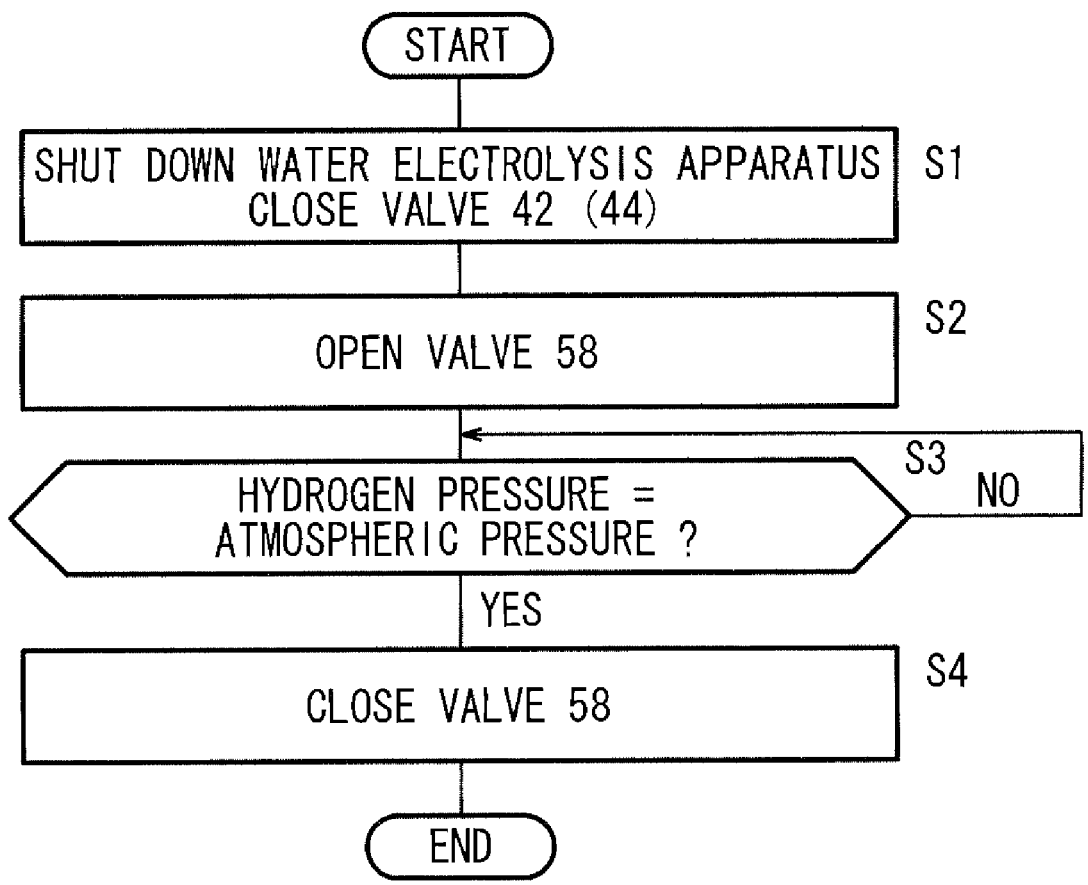
FIG. 2 is a flowchart of the system shutdown method according to the first embodiment.

The pure water supply apparatus 12 stops supplying pure water to the water electrolysis apparatus 14, and the electrolytic power supply 32 is turned off, shutting down the water electrolysis apparatus 14 in step S1 shown in FIG. 2. Substantially at the same time that the water electrolysis apparatus 14 is shut down, the back-pressure valve 42 (and, if necessary, the back-pressure valve 44) is closed.

The back-pressure valves 42, 44 are automatically closed when the water electrolysis apparatus 14 stops generating high-pressure hydrogen and the back pressure drops to a predetermined level or lower. If solenoid-operated valves are used instead of the back-pressure valves 42, 44, then a control process for closing the solenoid-operated valves need to be performed.

Figure 3:
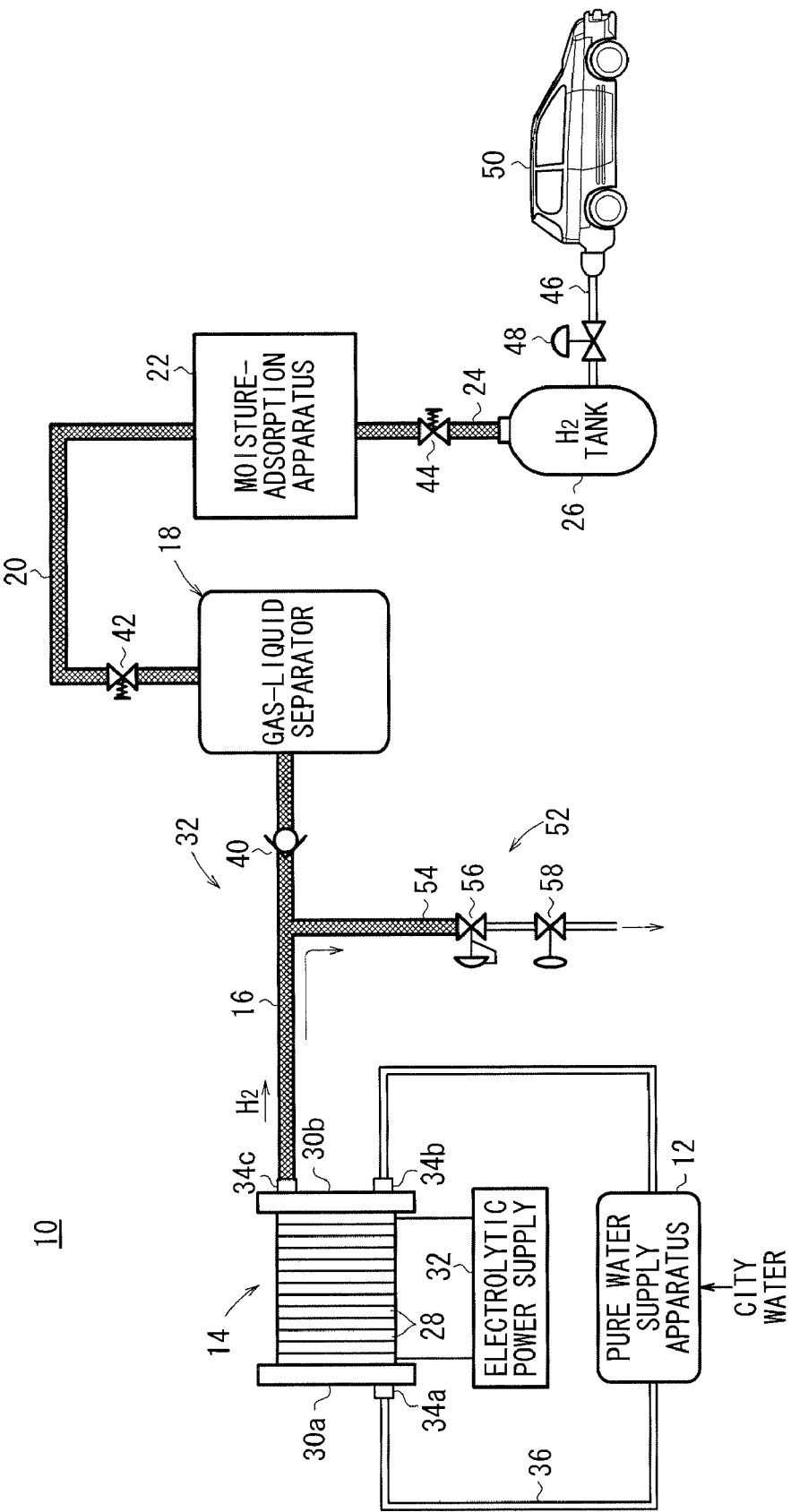
FIG. 3 is a schematic diagram illustrative of the system shutdown method according to the first embodiment.

In step S2, the solenoid-operated valve 58 of the pressure releasing device 52 is opened. The high-pressure hydrogen which remains in the water electrolysis apparatus 14 is introduced from the hydrogen outlet passage 16 into the bleeder passage 54 branched therefrom, depressurized by the pressure reducing valve 56, and then discharged from the solenoid-operated valve 58 (see FIG. 3). For instance, the hydrogen discharged from the solenoid-operated valve 58 should desirably be introduced into a diluter, not shown, diluted with air, and then discharged out.

Figure 4:
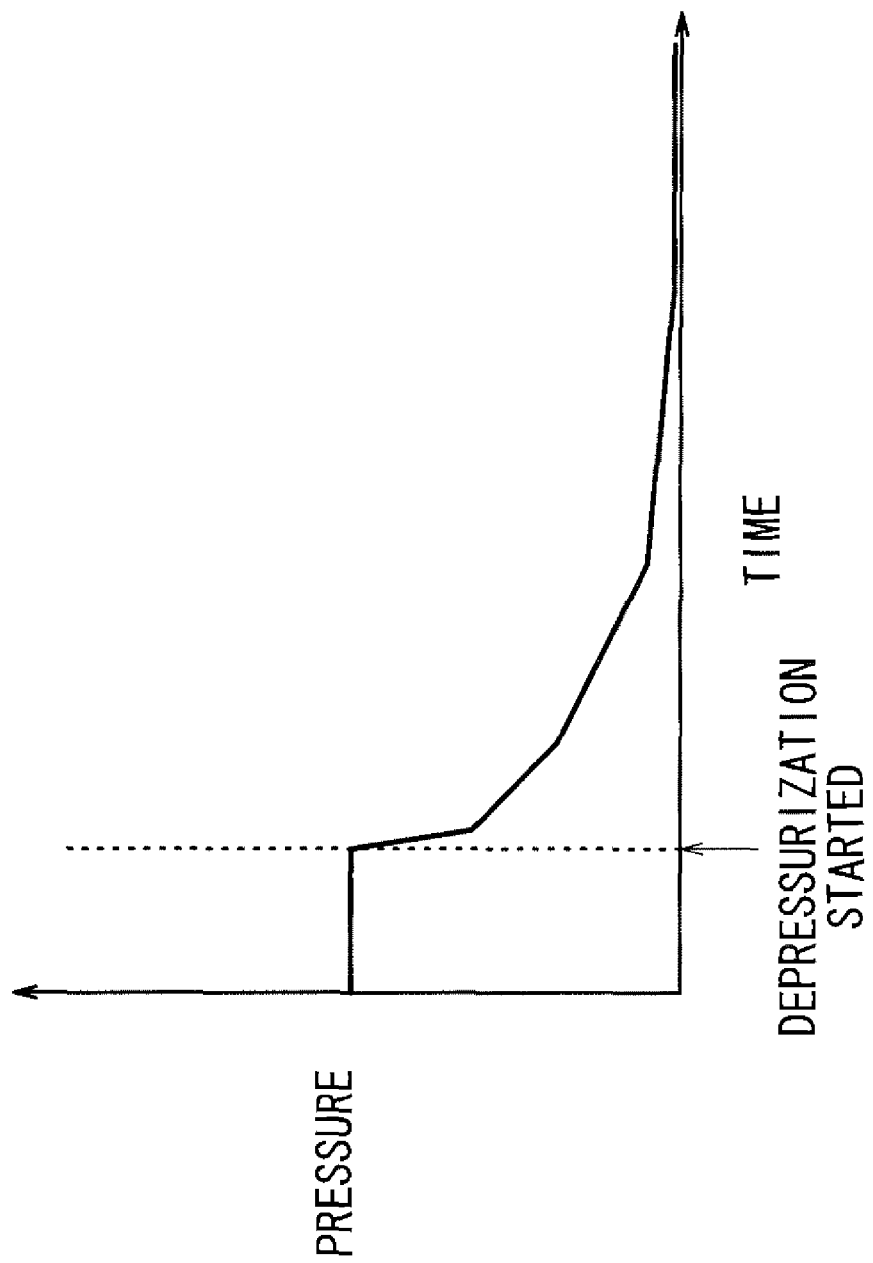
FIG. 4 is a graph illustrative of a pressure releasing rate.

The pressure reducing valve 56 adjusts the depressurization rate at which the high-pressure hydrogen discharged from the water electrolysis apparatus 14 is depressurized. Specifically, the pressure reducing valve 56 adjusts the depressurization rate so as to make constant the pressure ratio per unit time between the pressure of the high-pressure hydrogen before it is depressurized (initial pressure) and the pressure of the high-pressure hydrogen after it is depressurized (final pressure). For example, the pressure reducing valve 56 should preferably adjust the depressurization rate such that the pressure ratio will be smaller than 1/10 per minute (see FIG. 4).

As described above, the pressure releasing device 52 depressurizes the high-pressure hydrogen from the water electrolysis apparatus 14 while regulating the depressurization rate for the high-pressure hydrogen. If it is judged that the hydrogen pressure in the water electrolysis apparatus 14 has dropped to a predetermined pressure, e.g., the atmospheric pressure, ("YES" in step S3), then control goes to step S4 in which the solenoid-operated valve 58 is closed. The shutdown of the water electrolysis system 10 is now completed.

According to the first embodiment, for shutting down the water electrolysis system 10, the hydrogen pressure (high-pressure hydrogen) in the water electrolysis apparatus 14 is released independently from the gas-liquid separator 18 by the pressure releasing device 52 which is connected between the pipe (hydrogen outlet) 34c of the water electrolysis apparatus 14 and the check valve (inlet valve) 40 of the gas-liquid separator 18.

Therefore, the gas-liquid separator 18 and the moisture-adsorption apparatus (high-pressure hydrogen processing apparatus) 22, which contain a relatively large amount of high-pressure hydrogen therein, do not need to be depressurized, and any amount of high-pressure hydrogen which would otherwise be wasted is minimized. Consequently, the water electrolysis system 10 can electrolyze water efficiently and economically.

For resuming the water electrolysis system 10, only a minimum volume required, i.e., the water electrolysis apparatus 14, needs to be pressurized because the gas-liquid separator 18 and the moisture-adsorption apparatus 22 are kept under high pressure. Therefore, the power consumption at the time the water electrolysis system 10 is resumed is kept low, the water electrolysis system 10 can be resumed quickly, and its efficiency is increased.

According to the first embodiment, furthermore, the pressure releasing device 52 includes the pressure reducing valve 56 for regulating the pressure releasing rate for releasing the pressure of the high-pressure hydrogen from the water electrolysis apparatus 14, so that the pressure ratio per unit time is kept constant. As a result, the high-pressure hydrogen from the water electrolysis apparatus 14 will not be depressurized abruptly, and hence the solid polymer electrolyte membranes (ion exchange membranes) and seal members of the water electrolysis cells 28 are prevented, as much as possible, from being damaged, for instance, by an abrupt expansion of hydrogen which would otherwise occur.

Inasmuch as the pressure releasing device 52 includes the pressure reducing valve 56, the solenoid-operated valve 58 connected downstream of the pressure reducing valve 56 may comprise a low-cost valve for dealing with low pressures.

Figure 5:
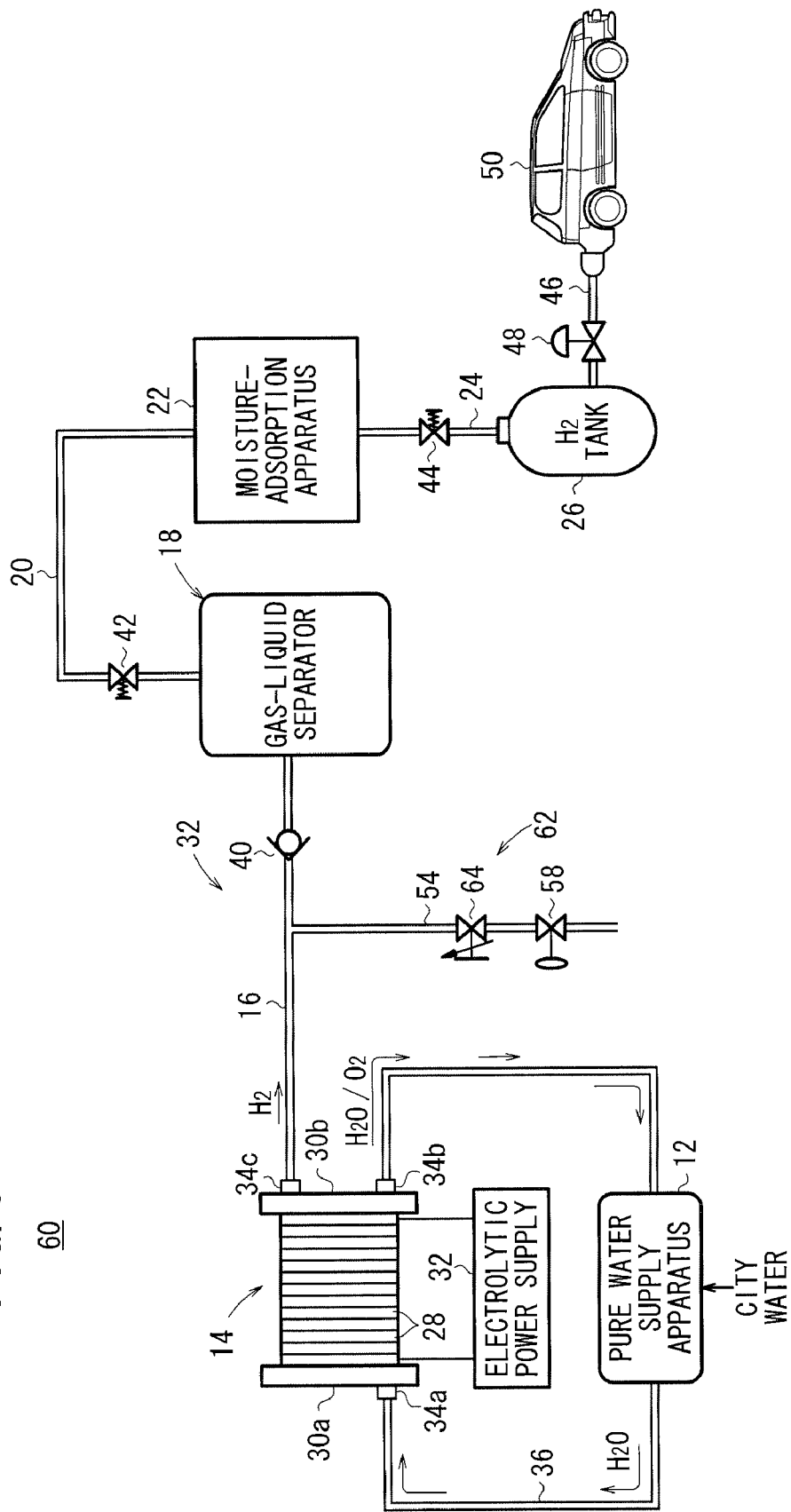
FIG. 5 is a schematic diagram of a water electrolysis system according to a second embodiment of the present invention.

FIG. 5 schematically shows a water electrolysis system 60 according to a second embodiment of the present invention.

Those parts of the water electrolysis system 60 which are identical to those of the water electrolysis system 10 according to the first embodiment are denoted by identical reference characters, and will not be described in detail below.

As shown in FIG. 5, the water electrolysis system 60 includes a pressure releasing device 62 connected to the hydrogen outlet passage 16 between the pipe 34c and the check valve 40. The pressure releasing device 62 has a function to release the hydrogen pressure in the water electrolysis apparatus 14 independently from the gas-liquid separator 18 and other components connected downstream thereof. The pressure releasing device 62 comprises a needle valve 64 and a solenoid-operated valve 58 which are connected to a bleeder passage 54 connected to the hydrogen outlet passage 16.

According to the second embodiment, the needle valve 64 is employed in place of the pressure reducing valve 56 according to the first embodiment for regulating the depressurization rate at which the high-pressure hydrogen discharged from the water electrolysis apparatus 14 is depressurized. Therefore, the water electrolysis system 60 offers the same advantages as the water electrolysis system 10 according to the first embodiment.

Figure 6:
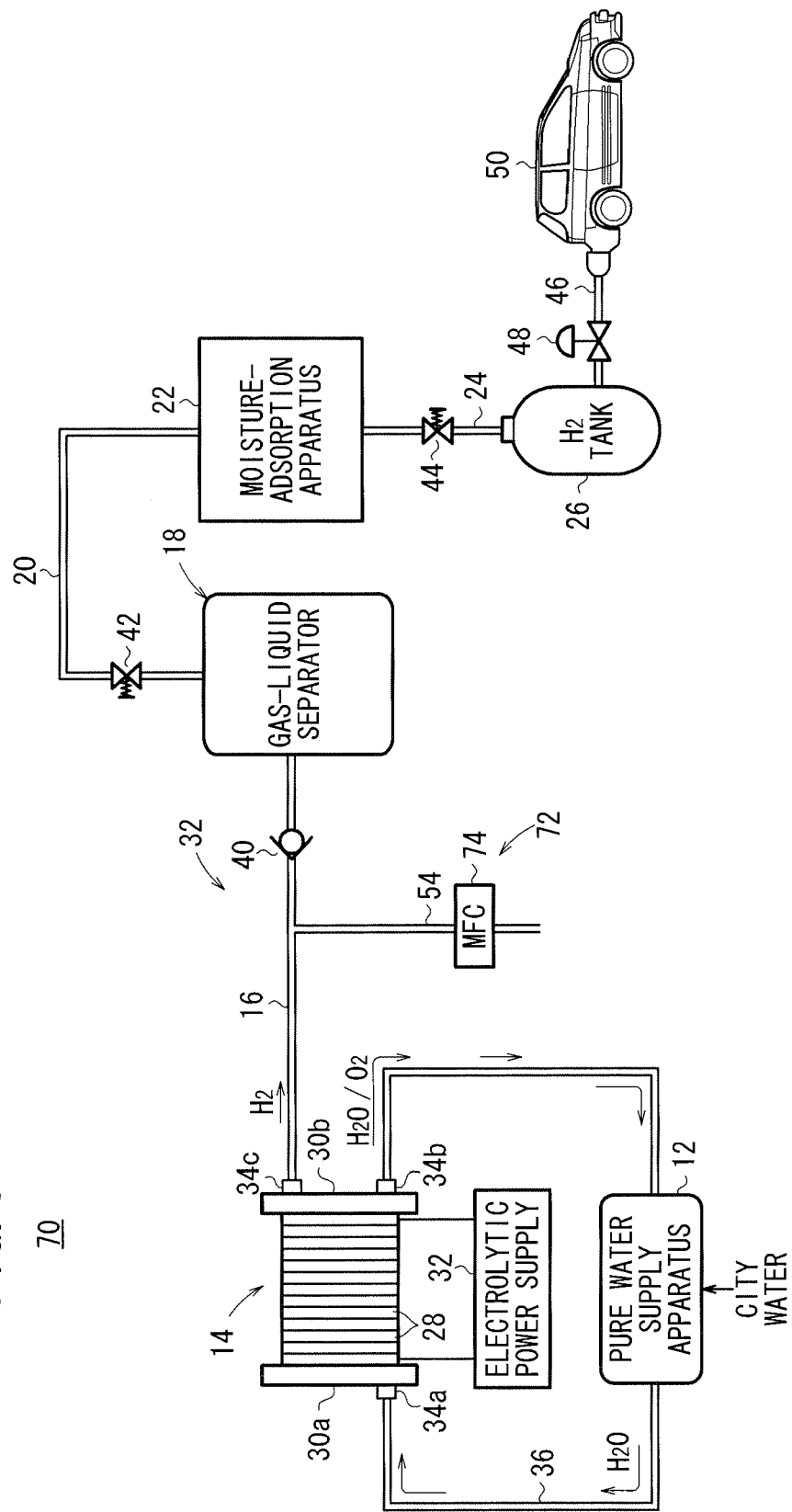
FIG. 6 is a schematic diagram of a water electrolysis system according to a third embodiment of the present invention.
Figure 7:
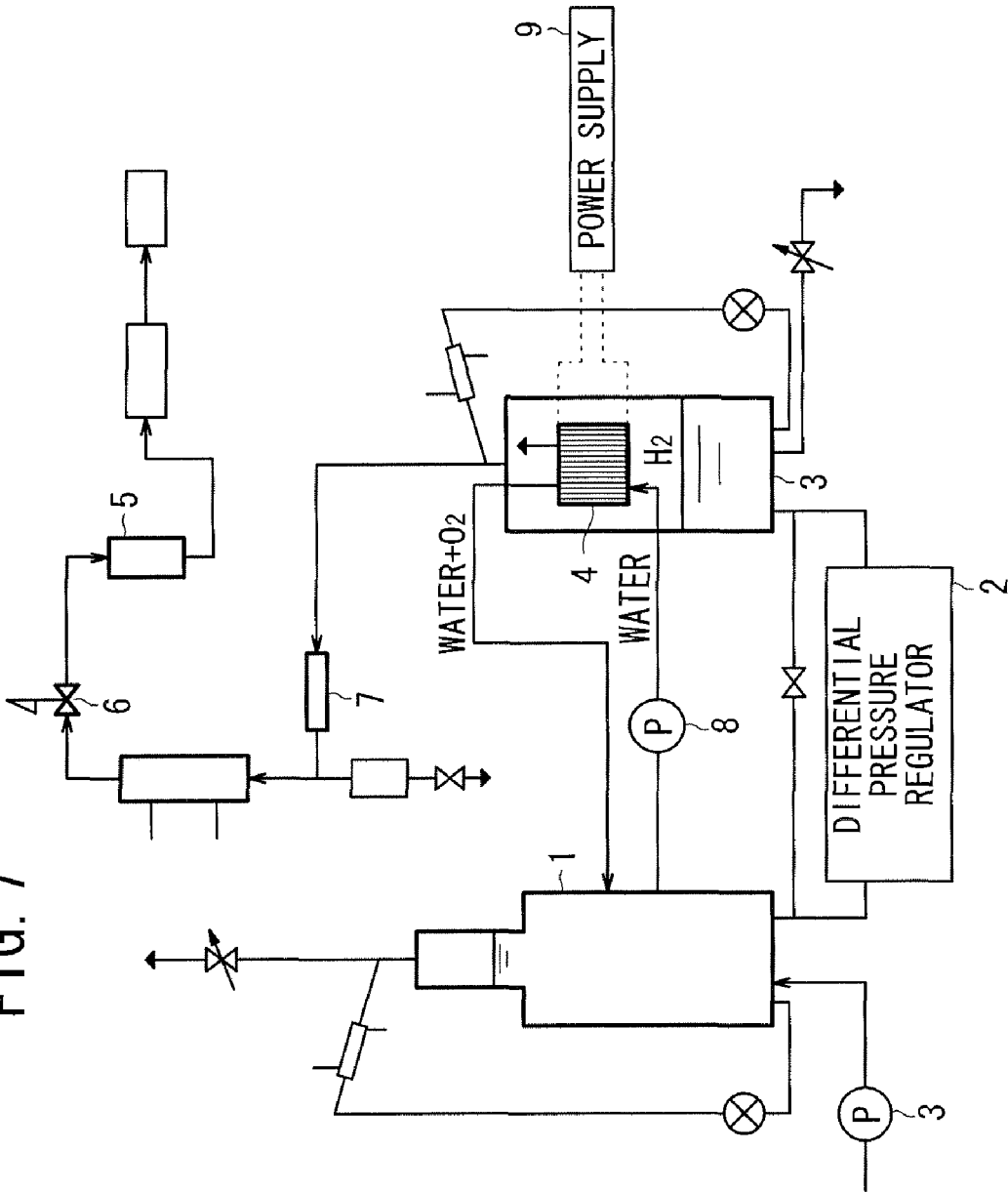
FIG. 7 is a schematic diagram of an apparatus for manufacturing high-pressure hydrogen disclosed in Japanese Laid-Open Patent Publication No. 2007-100204.

FIG. 6 schematically shows a water electrolysis system 70 according to a third embodiment of the present invention.

Those parts of the water electrolysis system 70 which are identical to those of the water electrolysis system 10 according to the first embodiment are denoted by identical reference characters, and will not be described in detail below.

As shown in FIG. 6, the water electrolysis system 70 includes a pressure releasing device 72 connected to the hydrogen outlet passage 16 between the pipe 34c and the check valve 40. The pressure releasing device 72 has a function to release the hydrogen pressure in the water electrolysis apparatus 14 independently from the gas-liquid separator 18 and other components connected downstream thereof. The pressure releasing device 72 comprises a mass flow controller (MFC) 74 and is free of the solenoid-operated valve.

The mass flow controller 74 is capable of lowering the pressure of the high-pressure hydrogen from the water electrolysis apparatus 14 to an atmospheric pressure while limiting the depressurization rate for the high-pressure hydrogen. The water electrolysis system 70 offers the same advantages as the water electrolysis system 10 according to the first embodiment and the water electrolysis system 60 according to the second embodiment.

In the first through third embodiments, the adjusting mechanisms for adjusting the pressure releasing rate comprise the pressure reducing valve 56, the needle valve 64, and the mass flow controller 74, respectively. However, each of the adjusting mechanisms may comprise any of various mechanisms such as an orifice, a ball valve, an opening control valve, or the like, or a plurality of such mechanisms in combination.

Although certain preferred embodiments of the present invention have been shown and described in detail, it should be understood that various changes and modifications may be made therein without departing from the scope of the appended claims.

What is claimed is:

1. A system shutdown method for shutting down a water electrolysis system that includes a water electrolysis apparatus for electrolyzing water with an electric current supplied from a DC power supply to generate hydrogen and oxygen, a hydrogen outlet passage disposed downstream of and connected to a hydrogen outlet of the water electrolysis apparatus which discharges a high-pressure hydrogen under a pressure higher than a normal pressure, and a high-pressure hydrogen processing apparatus connected to the hydrogen outlet passage, and refining the discharged high-pressure hydrogen; the system shutdown method comprising:

closing an outlet valve connected to an outlet port of the high-pressure hydrogen processing apparatus, and shutting down the water electrolysis apparatus;

closing an inlet valve disposed on the hydrogen outlet passage and connected to an inlet port of the high-pressure hydrogen processing apparatus;

releasing the pressure of the high-pressure hydrogen from the water electrolysis apparatus independently from the high-pressure hydrogen processing apparatus, with a pressure releasing device, the pressure releasing device being connected between the hydrogen outlet and the inlet valve and including a bleeder passage branched from the hydrogen outlet passage, to discharge only hydrogen in the hydrogen outlet passage upstream of the inlet valve and hydrogen in the water electrolysis apparatus, under a condition where the high-pressure hydrogen processing apparatus remains pressurized with the inlet valve; and stopping releasing the pressure of the high-pressure hydrogen from the water electrolysis apparatus when the pressure of the high-pressure hydrogen from the water electrolysis apparatus drops to an atmospheric pressure.

2. A system shutdown method according to claim 1, wherein the pressure releasing device adjusts a pressure releasing rate for the pressure of the high-pressure hydrogen from the water electrolysis apparatus.

3. The method of claim 1 wherein the pressure releasing device comprises:

a pressure reducing valve disposed in the bleeder passage; and a solenoid-operated valve disposed downstream of the pressure reducing valve in the bleeder passage, the solenoid-operated valve opened after a shutting down of the system so as to discharge hydrogen under a pressure reduced by the pressure reducing valve.

* * * * *